United States Patent [19]
Nedderman, Jr.

[11] Patent Number: 5,924,453
[45] Date of Patent: Jul. 20, 1999

[54] PISTON AND CYLINDER ACTUATED POLYMER MIXING VALVE

[75] Inventor: William H. Nedderman, Jr., Middletown, R.I.

[73] Assignee: The United States of America as represented by the Secretary of the Navy, Washington, D.C.

[21] Appl. No.: 09/062,565

[22] Filed: Apr. 20, 1998

[51] Int. Cl.$^6$ .................................................. G05D 11/03
[52] U.S. Cl. ............................................ 137/893; 251/58
[58] Field of Search .................................... 137/893, 895, 137/897, 605, 606; 251/58, 62

[56] References Cited

U.S. PATENT DOCUMENTS

| | | | |
|---|---|---|---|
| 2,953,344 | 9/1960 | Yancey | 251/58 |
| 4,185,054 | 1/1980 | Nakamura et al. | 137/895 X |
| 5,207,148 | 5/1993 | Anderson et al. | 137/893 X |
| 5,509,349 | 4/1996 | Anderson et al. | 137/893 X |
| 5,758,691 | 6/1998 | Nedderman, Jr. | 137/897 |

Primary Examiner—Stephen M. Hepperle
Assistant Examiner—John Bastianelli
Attorney, Agent, or Firm—Michael J. McGowan; Prithvi C. Lall; Robert W. Gauthier

[57] ABSTRACT

A valve for introducing polymer into a moving water stream prior to flowing the water stream, with the polymer therein, onto a hull surface of an underwater vehicle. The valve comprises a venturi block having therethrough a venturi passageway for flowing water therethrough, a polymer inlet tube extending through the venturi block and into the venturi passageway for introducing the polymer into the water flowing through the venturi passageway. A shut-off plunger extends through a bore in the venturi block and is axially aligned with the polymer inlet tube, the plunger being reciprocally movable in the bore between a first position in which a head portion of the plunger extends into and seals closed the polymer inlet tube, and a second position in which the head portion of the plunger is spaced from sealing engagement with said polymer inlet tube. A piston and cylinder assembly moves the plunger between the first and second positions.

12 Claims, 2 Drawing Sheets

PISTON AND CYLINDER ACTUATED POLYMER MIXING VALVE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The invention relates to mixing valves, and is directed more particularly to a valve for introducing a polymer into a stream of water prior to the flowing of the water and polymer mixture from an underwater vehicle and onto a hull surface thereof to reduce drag on the vehicle operating underwater.

(2) Description of the Prior Art

Drag created by the travel of underwater vehicles, caused by viscous effects of turbulent flow of water over exterior surfaces of the vehicle, limits the overall effectiveness and performance of such vehicles.

It is known to reduce such drag by delivering a stream of liquid polymer from inside the vehicle to the external hull surfaces of the vehicle, the polymer acting to reduce turbulence, and thereby reduce drag. A system for delivering polymer for such purpose is disclosed in U.S. patent application Ser. No. 08/083,222, filed Jun. 29, 1993, in the names of Pierre J. Corriveau et al.

The dispensed polymer, while effective to reduce drag, dissipates rather rapidly, being washed away by the water environment of the vehicle. Inasmuch as space is at a premium in such vehicles, the storage of large volumes of liquid polymer is not acceptable. Thus, if substantially pure polymer is dispensed, the time of its effectiveness is quite limited.

It is known that a slurry of water and liquid polymer, including a very small quantity of polymer in the slurry, such as 8 to 30 parts per million, is quite effective for the purpose. In view of this, the use of mixing valves for mixing together a small amount of polymer and a relatively large amount of water (taken from the water environment and therefore requiring no storage room) is known. The polymer is stored under pressure and, upon release, discharges into a stream of flowing water. It has been found, for example, that running the water through a venturi and injecting polymer into the venturi allows the water and polymer to mix sufficiently to be effective. A spring loaded valve has been used to close off the polymer. Pressurizing the polymer opened the valve and reducing the pressured closed the valve. It has been found, however, that when the polymer pressure is reduced, a small amount of water sometimes enters the valve polymer opening, causing the polymer to solidify at the opening. When this happens, it is necessary to disassemble the valve to remove the clog.

Accordingly, there is a need for a mixing valve which facilitates shutting off polymer flow while the polymer is under sufficient pressure to preclude water entry into the polymer valve opening.

SUMMARY OF THE INVENTION

It is, therefore, an object of the invention to provide a valve for introducing liquid polymer into a moving stream of water, prior to flowing the water and polymer together onto a hull surface of an underwater vehicle, and which may be closed while the polymer is under pressure, to prevent further flow of polymer into the water stream.

With the above and other objects in view, as will hereinafter appear, a feature of the invention is the provision of a valve for introducing polymer into a moving water stream prior to flowing the water stream, with the polymer therein, onto a hull surface of an underwater vehicle. The valve comprises a venturi block having therein a venturi passageway for flowing water therethrough, a polymer inlet tube extending through the venturi block and into the venturi passageway for introducing the polymer into the water flowing through the venturi passageway. A shut-off plunger extends through a bore in the venturi block and is axially aligned with the polymer inlet tube, the plunger being reciprocally movable in the bore between a first position in which a head portion of the plunger extends into and seals closed the polymer inlet tube, and a second position in which the head portion of the plunger is spaced from sealing engagement with the polymer inlet tube. A piston and cylinder assembly is provided for moving the plunger between the first and second positions.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENT

Figure 1:
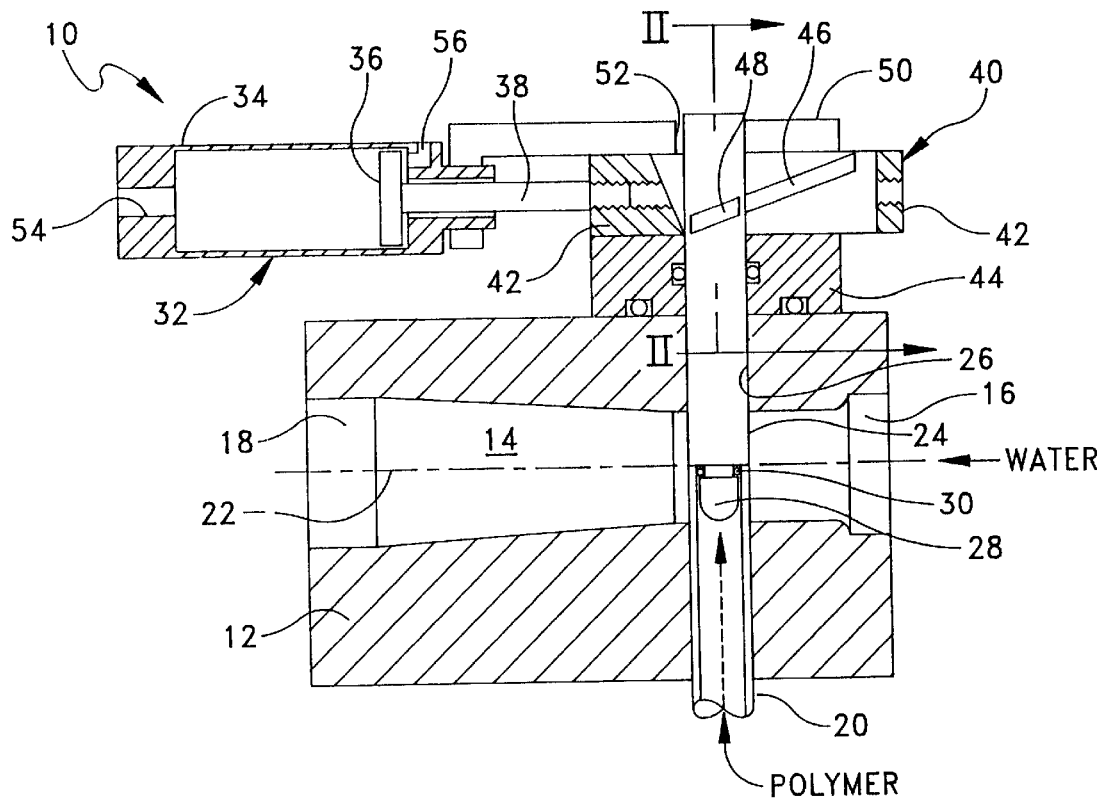
FIG. 1 is a generally sectional view of one form of a valve illustrative of an embodiment of the invention.

Referring to the FIG. 1, it will be seen that an illustrative valve 10 includes a venturi block 12 having a venturi passageway 14 extending therethrough for flow of water from a venturi water entrance 16, through venturi passageway 14, to a venturi water outlet 18.

A polymer inlet tube 20 extends through venturi block 12, substantially normal to an axis 22 of venturi passageway 14 and into venturi passageway 14 for introducing liquid polymer into the water flowing through venturi passageway 14.

A shut-off plunger 24 extends through a bore 26 in venturi block 12 and is axially aligned with polymer inlet tube 20.

The plunger 24 is reciprocally movable in bore 26 between a first position (FIG. 1) in which a head portion 28 of plunger 24 extends into and seals closed polymer inlet tube 20, and a second position (FIG. 3) in which head portion 28 of plunger 24 is spaced from sealing engagement with polymer inlet tube 20.

Figure 4:
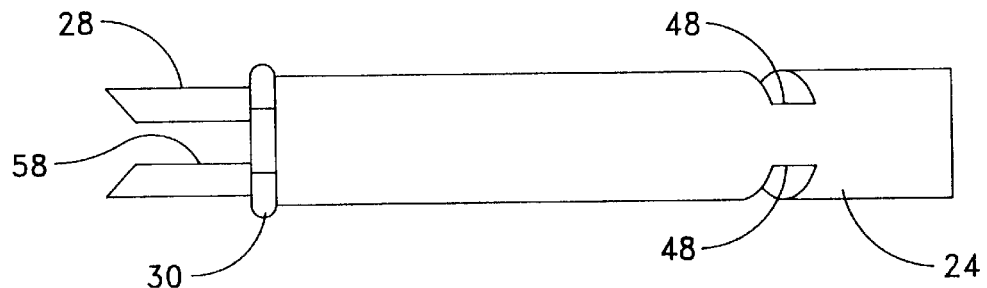
FIG. 4 is a side elevational view of a plunger portion of the valve of FIG. 3, shown turned 90° to the position in which it is shown in FIG. 3.
Figure 5:
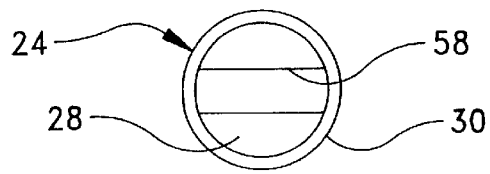
FIG. 5 is a distal end view of the plunger portion of FIG. 4.

Referring to FIGS. 4 and 5, it will be seen that plunger head portion 28 may be divided to provide increased flow area through head portion 28, when such flow is desired. The head portion 28 is provided with at least one O-ring seal 30 for effectively sealing off polymer flow from polymer inlet tube 20, when no flow is desired.

Referring again to FIG. 1, it will be seen that the valve further includes a piston and cylinder assembly 32 for moving shut-off plunger 24 between the aforesaid first and second positions. The piston and cylinder assembly 32 includes a cylinder 34 extending substantially parallel to axis 22 of venturi passageway 14. A piston 36 in cylinder 34 and a piston rod 38 are movable in directions substantially parallel to the axis of venturi passageway 14.

Figure 2:
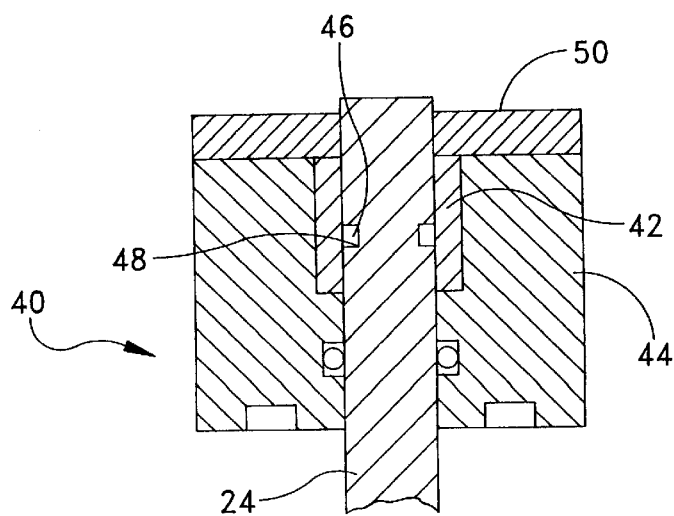
FIG. 2 is a sectional view taken along line II—II of FIG. 1.

Referring now also to FIG. 2, a slide means 40 interconnects piston 36 and plunger 24 for converting the movements of piston rod 38 to movements of plunger 24 in directions normal to venturi passageway 14 to a selected one of the aforesaid first and second positions. The slide means 40 includes a slide member 42 fixed to piston rod 38, and a slide block 44 fixed to venturi block 12 and mounting slide member 42 for sliding in slide block 44 (FIG. 2).

A first slide structure, preferably elongated spline-like projections 46, are disposed on slide member 42, and a second slide structure, preferably grooves 48, are disposed in plunger 24. The projections 46 and grooves 48 are complementary to each other and are interconnected so as to effect the aforesaid conversion of movements. It will be apparent that the projection and groove arrangement can be reversed, such that grooves are disposed in slide member 42 and projections extend from plunger 24.

Figure 3:
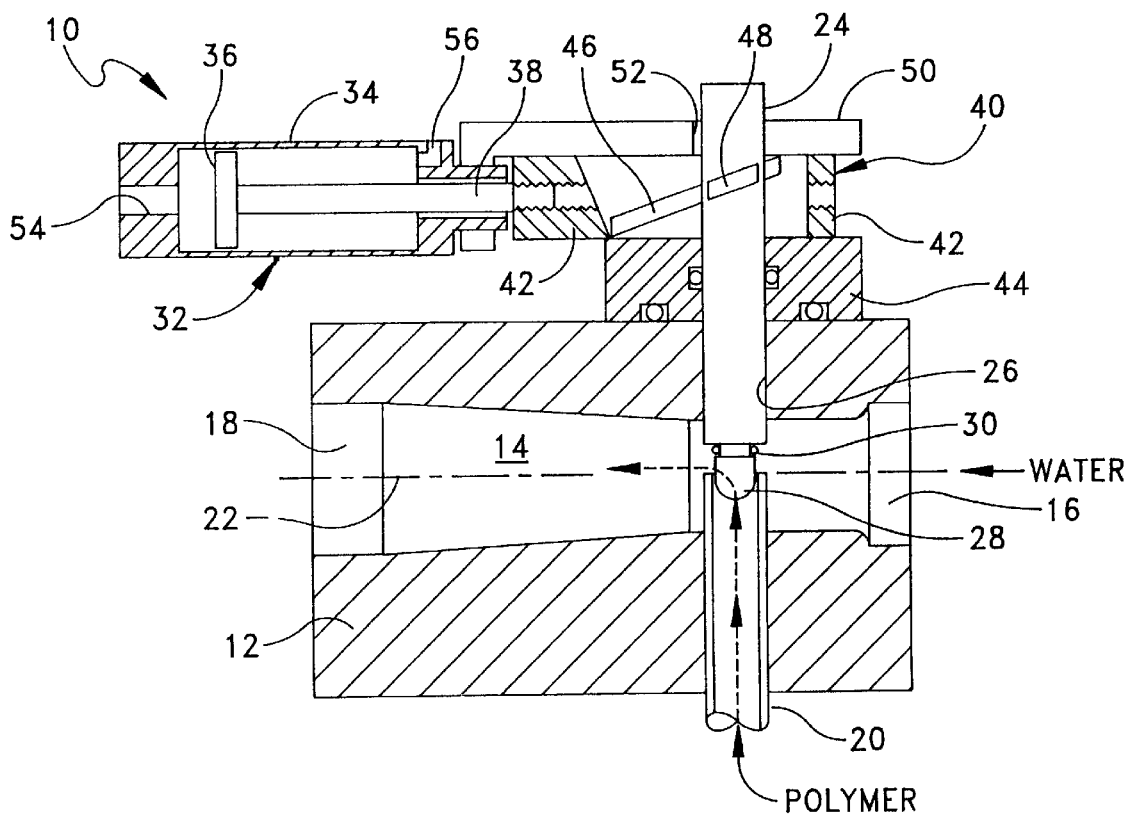
FIG. 3 is similar to FIG. 1, but showing the valve in a different operational mode.

As shown in FIGS. 1 and 3, grooves 48 and projections 46 are complementarily inclined relative to the axis of piston rod 38. It has been found that an incline of about 21° performs satisfactorily.

A slide retainer 50 is fixed to cylinder 34 and extends therefrom, overlying slide member 42. The slide retainer 50 defines a bore 52 through which plunger 24 extends and is slidably retained therein.

In operation, cylinder 34 is pressurized by fluid entering a cylinder opening 54 and vents out a cylinder opening 56, enabling piston 36 and piston rod 38 to move rightwardly, as viewed in FIG. 1, to cause slide member 42 to move rightwardly. As inclined elongated projections 46 move rightwardly in grooves 48, shut-off plunger 24 moves downwardly. The plunger head portion 28 enters polymer inlet tube 20, against the pressure therein, with o-ring seal 30 engaging the interior of inlet tube 20 to seal off the tube and stop the flow of liquid polymer therethrough.

When flow of polymer is desired, fluid under pressure is introduced into cylinder 34 through cylinder opening 56 and cylinder 34 is vented through cylinder opening 54, causing piston 36 to move leftwardly, as viewed in FIG. 3, to cause plunger 24 to move upwardly to disengage sealing ring 30 from tube 20 and to remove head portion 28 from tube 20, sufficiently to permit polymer to flow around head portion 28 and through a gap 58 (FIGS. 4 and 5) in head portion 28, and into venturi passageway 14 to mix with a stream of water flowing therethrough.

There is thus provided a valve which admits liquid polymer under pressure into a venturi passageway to mix with a stream of water, and which can be closed against the pressure of the polymer to stop flow of polymer into the venturi passageway, without water entering the polymer inlet.

Obviously many modifications and variations of the present invention may become apparent in light of the above teachings. For example, the valve can be used for mixing of other materials besides water and polymer, such as mixing of a two part epoxy. The shape of the flow passages in the venturi block, as well as the shape of the plunger can be changed to suit the materials used. It will also be appreciated that the angle of the grooves and projections can be reversed such that movement of the piston towards the plunger would result in movement of the plunger out of the inlet tube.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A valve for introducing an additive material into a moving liquid stream, said valve comprising a venturi block having a venturi passageway therethrough for flowing liquid through the venturi block;

an additive material inlet tube extending through said venturi block and into said venturi passageway for introducing the additive material into the liquid stream flowing through the venturi passageway;

a shut-off plunger extending through a bore in said venturi block and axially aligned with said additive material inlet tube, said plunger being reciprocally movable in said bore between a first position in which a head portion of said plunger extends into and seals closed the additive material inlet tube, and a second position in which said head portion of said plunger is spaced from sealing engagement with said additive material inlet tube;

a cylinder extending substantially parallel to an axis of said venturi passageway;

a piston and piston rod movable in directions parallel to the axis of said venturi passageway;

a slide member fixed to said piston rod;

a slide block fixed to said venturi block and mounting said slide member for sliding in said slide block;

a slide retainer fixed to said cylinder and extending therefrom and overlying said slide member, said slide retainer having a bore therethrough, said plunger being slidably disposed in said slide retainer bore;

first slide structure disposed on said slide member; and second slide structure disposed on said plunger, said first and second slide structures being complementary to each other and being interconnected, so as to interconnect said piston rod and said plunger for converting the movements of said piston rod to movements of said plunger in directions normal to said passageway to a selected one of said first and second positions.

2. The valve in accordance with claim 1 wherein:

said first slide structure comprises a selected one of projections and grooves; and said second slide structure comprises a selected one of projections and grooves complementary to said first slide structure.

3. The valve in accordance with claim 2 wherein:

said first slide structure comprises projections extending from said slide member; and said second slide structure comprises grooves in said plunger, said projections being slidably disposed in said grooves.

4. The valve in accordance with claim 3 wherein:

said projections comprise elongated splines extending along opposed surfaces of said slide member; and said grooves comprise a groove on each of two sides of said plunger.

5. The valve in accordance with claim 4 wherein said projections are inclined along said surfaces, and said grooves are complementarily inclined.

6. The valve in accordance with claim 5 wherein said projections are inclined at about 21° to a lengthwise axis of said slide member.

7. A valve for introducing an additive material into a moving liquid stream, said valve comprising:

a venturi block having a venturi passageway therethrough for flowing liquid through the venturi block;

an additive material inlet tube extending through said venturi block and into said venturi passageway for introducing the additive material into the liquid stream flowing through the venturi passageway;

a shut-off plunger extending through a bore in said venturi block and axially aligned with said additive material inlet tube, said plunger being reciprocally moveable in said bore between a first position in which a head portion of said plunger extends into and seals closed the additive material inlet tube, and a second position in which said head portion of said plunger is spaced from sealing engagement with said additive material inlet tube;

a sealing ring mounted on said plunger head portion, the sealing ring engagable with interior surfaces of said additive material inlet tube to seal said inlet tube to stop flow of the additive material into said venturi passageway; and a piston and cylinder assembly for moving said plunger between said first and second positions.

8. The valve in accordance with claim 7 wherein said head portion is divided to provide an additive material flow passage therethrough.

9. A valve for introducing an additive material into a moving liquid stream, said valve comprising:

a venturi block having a venturi passageway therethrough for flowing liquid through the venturi block;

an additive material inlet tube extending through said venturi block and into said venturi passageway for introducing the additive material into the liquid stream flowing through the venturi passageway;

a shut-off plunger extending through a bore in said venturi block and axially aligned with said additive material inlet tube, said plunger being reciprocally movable in said bore between a first position in which a head portion of said plunger extends into and seals closed the additive material inlet tube, and a second position in which said head portion of said plunger is spaced from sealing engagement with said additive material inlet tube;

a cylinder extending substantially parallel to an axis of said venturi passageway;

a piston and piston rod movable in directions parallel to the axis of said venturi passageway;

a slide member fixed to said piston rod;

a slide block fixed to said venturi block and mounting said slide member for sliding in said slide block;

a first slide structure in the form of projections extending from said slide member; and a second slide structure in form of grooves in said plunger, said projections being slidably disposed in said grooves, said first and second slide structure interconnecting said piston rod and said plunger for converting the movements of said piston rod to movements of said plunger in directions normal to said passageway to a selected one of said first and second positions.

10. The valve in accordance with claim 9 wherein:

said projections comprise elongated splines extending along opposed surfaces of said slide member; and said grooves comprise a groove on each of two sides of said plunger.

11. The valve in accordance with claim 10 wherein said projections are inclined along said surfaces, and said grooves are complementarily inclined.

12. The valve in accordance with claim 11 wherein said projections are inclined at about 21° to a lengthwise axis of said slide member.

* * * * *